US 8,722,804 B2

United States Patent
Lue et al.

(10) Patent No.: US 8,722,804 B2
(45) Date of Patent: May 13, 2014

(54) POLYMER BLENDS AND FILMS MADE THEREFROM

(75) Inventors: Ching-Tai Lue, Sugar Land, TX (US); Christopher R. Davey, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 13/635,931

(22) PCT Filed: Mar. 22, 2011

(86) PCT No.: PCT/US2011/029422
§ 371 (c)(1), (2), (4) Date: Dec. 13, 2012

(87) PCT Pub. No.: WO2011/129956
PCT Pub. Date: Oct. 20, 2011

(65) Prior Publication Data
US 2013/0085231 A1    Apr. 4, 2013

Related U.S. Application Data

(60) Provisional application No. 61/323,601, filed on Apr. 13, 2010.

(51) Int. Cl.
*C08F 8/00* (2006.01)
*C08L 23/06* (2006.01)

(52) U.S. Cl.
USPC .......................................... 525/191; 525/240

(58) Field of Classification Search
USPC .................................................. 525/191, 240
See application file for complete search history.

(56) References Cited

U.S. PATENT DOCUMENTS

| 5,681,523 | A | 10/1997 | Cobler et al. |
| 6,083,611 | A | 7/2000 | Eichbauer et al. |
| 7,235,607 | B2 * | 6/2007 | Ohlsson ........................ 525/191 |
| 8,227,552 | B2 * | 7/2012 | Kolb et al. .................... 525/240 |

FOREIGN PATENT DOCUMENTS

| WO | WO 01/92405 | 12/2001 |
| WO | WO 2007/130277 | 11/2007 |

* cited by examiner

*Primary Examiner* — Nathan M Nutter
(74) *Attorney, Agent, or Firm* — Jennifer A. Schmidt; Kristina Leavitt

(57) ABSTRACT

Polymer blends and films made therefrom are provided. The polymer blend can include a first polyethylene having a density of less than about 0.940 g/cm$^3$, a melt index ($I_2$) greater than 0.75 g/10 min, and a melt index ratio ($I_{21}/I_2$) of less than 30. The polymer blend can also include a second polyethylene having a density of less than about 0.940 g/cm, a melt index ($I_2$) of less than 1 g/10 min, a melt index ratio ($I_{21}/I_2$) greater than 30, and a molecular weight distribution (Mw/Mn) of less than 4.5.

19 Claims, No Drawings

POLYMER BLENDS AND FILMS MADE THEREFROM

This application is a National Stage application under 35 U.S.C. §371 of International Application No. PCT/US2011/029422, filed Mar. 22, 2011, that claims the benefit of Ser. No. 61/323,601, filed Apr. 13, 2010, the disclosures of which are incorporated by reference in their entireties.

BACKGROUND

Stretch films are widely used in a variety of bundling and packaging applications, for example, bundling goods for shipping and storage. Stretch films or stretch cling films having high cling properties are particularly useful because the high cling helps prevent unraveling of the film from the bundled goods. As the film is stretched, however, localized deformation can result in a large fluctuation in elongation, giving rise to bands of weaker and more elongated film transverse to the direction of stretching, a defect known as "tiger striping." Additionally, tiger striping is usually accompanied by a decrease in cling, which is undesirable.

To impart cling properties or to improve the cling properties of a particular film, a number of techniques have been used, including the addition of tackifying additives or "tackifiers." Such tackifiers include polybutenes, low molecular weight polyisobutylenes (PIB), polyterpenes, amorphous polypropylene, ethylene vinyl acetate copolymers, microcrystalline wax, alkali metal sulfosuccinates, and mono- and di-glycerides of fatty acids. Current stretch films, however, still exhibit tiger striping and undesirable losses in cling upon stretching.

There is a need, therefore, for improved stretch cling films having improved cling after stretching and/or having reduced or no formation of tiger stripping during stretching of the film.

SUMMARY

Polymer blends and films made therefrom are provided. The polymer blend can include a first polyethylene having a density of less than about 0.940 g/cm$^3$, a melt index ($I_2$) greater than 0.75 g/10 min, and a melt index ratio ($I_{21}/I_2$) of less than 30. In some embodiments, the first polyethylene has a density in the range of from about 0.915 g/cm g/cm$^3$ to about 0.940 g/cm$^3$, a melt index ($I_2$) of from about 0.75 g/10 min to about 20, and a melt index ratio ($I_{21}/I_2$) of from about 20 to about 30. The polymer blend can also include a second polyethylene having a density of less than about 0.940 g/cm, a melt index ($I_2$) of less than 1 g/10 min, a melt index ratio ($I_{21}/I_2$) greater than 30, and a molecular weight distribution (Mw/Mn) of less than 4.5. In some embodiments, the second polyethylene can have a density of from about 0.915 g/cm$^3$ to about 0.940 g/cm, a melt index ($I_2$) of from about 0.01 g/10 min to about 0.9 g/10 min, a melt index ratio ($I_{21}/I_2$) of from about 30 to about 100, and a molecular weight distribution (Mw/Mn) of from about 3 to about 4.5.

Also disclosed herein are methods for making the polymer blend. The method can comprise blending the first polyethylene with the second polyethylene at conditions sufficient to produce a polyethylene blend.

DETAILED DESCRIPTION

It has been discovered that stretch films made from a polymer blend comprising two or more polyethylenes as discussed and described herein can have improved properties, including an applicability over a wide range of stretch ratios without suffering from localized deformation leading to tiger striping. In fact, it has been surprisingly and unexpectedly discovered that the occurrence of tiger striping in stretch films made from a first polyethylene having a density of less than about 0.940 g/cm$^3$, a melt index ($I_2$) of from about 0.75 g/10 min to about 20 g/10 min, and a melt index ratio ($I_{21}/I_2$) of less than 30 can be eliminated by blending the first polyethylene with another polyethylene ("second polyethylene") having a melt index ($I_2$) less than 1 g/10 min, a melt index ratio ($I_{21}/I_2$) greater than 30, and a molecular weight distribution (Mw/Mn) of less than 4.5. Furthermore, it has also been surprisingly and unexpectedly discovered that films made from a polymer blend having the first polyethylene and the second polyethylene can have improved cling properties before stretching, after stretching, or both.

The term "polyethylene" refers to a polymer having at least 50 wt % ethylene-derived units, preferably at least 70 wt % ethylene-derived units, more preferably at least 80 wt % ethylene-derived units, or 90 wt % ethylene-derived units, or 95 wt % ethylene-derived units, or 100 wt % ethylene-derived units. The first and second polyethylenes can thus be homopolymers or copolymers, including a terpolymer, having one or more other monomeric units, or any combination thereof. As such, the first polyethylene and/or the second polyethylene can include, for example, one or more other olefin(s) and/or α-olefin comonomer(s). Illustrative α-olefin comonomers can include, but are not limited to, those having from 3 to about 20 carbon atoms, such as $C_3$-$C_{20}$ α-olefins, $C_3$-$C_{12}$ α-olefins, or $C_3$-$C_8$ α-olefins. Suitable α-olefin comonomers can be linear or branched or can include two unsaturated carbon-carbon bonds (dienes). Two or more comonomers can be used. Examples of suitable comonomers can include, but are not limited to, linear $C_3$-$C_{12}$ α-olefins and α-olefins having one or more $C_1$-$C_3$ alkyl branches or an aryl group.

Examples of useful comonomers include propylene; 1-butene; 3-methyl-1-butene; 3,3-dimethyl-1-butene; 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene; and combinations thereof. Preferred comonomers include 1-butene, 1-hexene, and 1-octene.

If one or more comonomers are used, the monomer, i.e. ethylene, can be polymerized in a proportion of from about 50 wt % to about 99.9 wt % of monomer, or from about 70 wt % to about 99 wt % of monomer, or from about 80 wt % to about 98 wt % of monomer, with from about 0.1 wt % to about 50 wt % of the one or more comonomers, or from about 1 wt % to about 30 wt % of the one or more comonomers, or from about 2 wt % to about 20 wt % of the one or more comonomers. If one or more comonomers are present in either or both the first polyethylene and the second polyethylene, the amount of the one or more comonomers in the first polyethylene and the second polyethylene can be the same or different. For example, the first polyethylene can have a comonomer concentration ranging from about 10 wt % to about 20 wt % and the second polyethylene can have a comonomer concentration ranging from about 2 wt % to about 10 wt %. The particular comonomer(s), if present, in the first polyethylene and the second polyethylene can be the same or different. For example, the first polyethylene and the second polyethylene can both include 1-hexene as the comonomer. In another example, the first polyethylene can include 1-hexene as the comonomer and the second polyethylene can include 1-butene as the comonomer.

The first polyethylene can be blended with one or more second polyethylenes to produce a polymer blend. The first polyethylene can be distinguished from the second polyethylene by differing in at least one property or characteristic. For example, the first polyethylene can be distinguished from the second polyethylene by having a different melt index ($I_2$), molecular weight distribution (MWD), melt index ratio ($I_{21}/I_2$), or any combination thereof. In another example, the first polyethylene can be a linear low density polyethylene (LLDPE) and the second polyethylene can be a low density polyethylene (LDPE). LDPE can also be referred to as "branched" or "heterogeneously branched" polyethylene because of the relatively large number of long chain branches extending from the main polymer backbone. Unlike LDPE, LLDPE is a linear polyethylene and does not contain long chain branching. As such, the first polyethylene can be a linear polyethylene, i.e. no long chain branching, and the second polyethylene can include long chain branching.

The first polyethylene can have a density of from about 0.890 g/cm$^3$ to about 0.940 g/cm$^3$. For example, the first polyethylene can have a density ranging from a low of about 0.910 g/cm$^3$, about 0.912 g/cm$^3$, or about 0.915 g/cm$^3$ to a high of about 0.930 g/cm$^3$, about 0.935 g/cm$^3$, or about 0.940 g/cm$^3$. The first polyethylene can have a density of from about 0.915 g/cm$^3$ to about 0.935 g/cm$^3$, or about 0.915 g/cm$^3$ to about 0.930 g/cm$^3$, or about 0.915 g/cm$^3$ to about 0.925 g/cm$^3$, or about 0.916 g/cm$^3$ to about 0.924 g/cm$^3$, or about 0.917 g/cm$^3$ to about 0.923 g/cm$^3$, or about 0.918 g/cm$^3$ to about 0.922 g/cm$^3$. Density is a physical property of a composition and can be determined in accordance with ASTM D-792.

The second polyethylene can have a density of less than about 0.940 g/cm$^3$. The second polyethylene can have a density ranging from a low of about 0.900 g/cm$^3$, about 0.905 g/cm$^3$, or about 0.910 g/cm$^3$ to a high of about 0.920 g/cm$^3$, about 0.925 g/cm$^3$, about 0.930 g/cm$^3$, or about 0.935 g/cm$^3$. For example, the second polyethylene can have a density ranging from a low of about 0.915 g/cm$^3$, about 0.917 g/cm$^3$, or about 0.918 g/cm$^3$ to a high of about 0.920 g/cm$^3$, about 0.922 g/cm$^3$, about 0.925 g/cm$^3$, or about 0.927 g/cm$^3$. The second polyethylene can have a density of from about 0.915 g/cm$^3$ to about 0.935 g/cm$^3$, or about 0.915 g/cm$^3$ to about 0.930 g/cm$^3$, or about 0.915 g/cm$^3$ to about 0.925 g/cm$^3$, or about 0.916 g/cm$^3$ to about 0.924 g/cm$^3$, or about 0.917 g/cm$^3$ to about 0.923 g/cm$^3$, or about 0.918 g/cm$^3$ to about 0.922 g/cm$^3$ The term "molecular weight distribution" means the same thing as polydispersity index (PDI). The molecular weight distribution (PDI) is the ratio of weight-average molecular weight (Mw) to number-average molecular weight (Mn), i.e., Mw/Mn.

Mw, Mn, and Mz can be measured using gel permeation chromatography (GPC), also known as size exclusion chromatography (SEC). This technique utilizes an instrument containing columns packed with porous beads, an elution solvent, and detector in order to separate polymer molecules of different sizes. Measurement of molecular weight by SEC is well known in the art and is discussed in more detail in, for example, Slade, P. E. Ed., Polymer Molecular Weights Part II, Marcel Dekker, Inc., NY, (1975) 287-368; Rodriguez, F., Principles of Polymer Systems 3rd ed., Hemisphere Pub. Corp., NY, (1989) 155-160; U.S. Pat. No. 4,540,753; and Verstrate et al., Macromolecules, vol. 21, (1988) 3360; T. Sun et al., Macromolecules, Vol. 34, (2001) 6812-6820.

The first polyethylene can have a molecular weight distribution (Mw/Mn) of from about 3.5 to about 5.5. For example, the first polyethylene can have a molecular weight distribution (Mw/Mn) ranging from a low of about 3.5, about 3.7, or about 4 to a high of about 5, about 5.25, or about 5.5. The first polyethylene can have a molecular weight distribution (Mw/Mn) of from about 3.6 to about 5.4, about 3.8 to about 5.1, or about 3.9 to about 4.9.

The second polyethylene can have a molecular weight distribution (Mw/Mn) of less than about 4.5, preferably less than about 4.3, or 4.1, or 4, or 3.9, or 3.8, or 3.7, or 3.6, or 3.5. For example, the second polyethylene can have a molecular weight distribution (Mw/Mn) ranging from a low of about 3.0, about 3.1, about 3.2, or about 3.3 to a high of about 4, about 4.1, about 4.2, or about 4.3. The molecular weight distribution (Mw/Mn) of the second polyethylene composition can range from about 3.0 to about 4.5, from about 3.2 to about 4, from about 3.2 to about 3.9, or from about 3.2 to about 3.7.

The first polyethylene can have a melt index (MI) or ($I_2$) of from about 0.75 g/10 min to about 20 g/10 min. The MI ($I_2$) is measured in accordance with ASTM D-1238-E (at 190° C., 2.16 kg weight). The first polyethylene can have a MI ($I_2$) ranging from about 0.75 g/10 min to about 15 g/10 min, about 0.85 g/10 min to about 10 g/10 min, or about 0.9 g/10 min to about 8 g/10 min. For example, the first polyethylene can have a MI ($I_2$) ranging from a low of about 0.75 g/10 min, about 1 g/10 min, or about 2 g/10 min to a high of about 3 g/10 min, about 4 g/10 min, or about 5 g/10 min. For example, the first polyethylene can have a MI ($I_2$) of from about 0.75 g/10 min to about 6 g/10 min, about 1 g/10 min to about 8 g/10 min, about 0.8 g/10 min to about 6 g/10 min, or about 1 g/10 min to about 4.5 g/10 min. In another example, the first polyethylene can have a MI ($I_2$) greater than 1 g/10 min.

The second polyethylene can have a MI ($I_2$) of less than 1 g/10 min. The second polyethylene can have a MI ($I_2$) of less than about 0.9 g/10 min, less than about 0.8 g/10 min, less than about 0.7 g/10 min, less than about 0.6 g/10 min, less than about 0.5 g/10 min, less than about 0.4 g/10 min, less than about 0.3 g/10 min, less than about 0.2 g/10 min, or less than about 0.1 g/10 min. The second polyethylene can have a MI ($I_2$) ranging from a low of about 0.01 g/10 min, about 0.05 g/10 min, about 0.1 g/10 min, about 0.2 g/10 min, or about 0.3 g/10 min to a high of about 0.5 g/10 min, about 0.6 g/10 min, about 0.7 g/10 min, about 0.8 g/10 min, or about 0.9 g/10 min. For example, the second polyethylene can have a MI ($I_2$) of from about 0.01 g/10 min to about 0.6 g/10 min, about 0.1 g/10 min to about 0.7 g/10 min, about 0.2 g/10 min to about 0.75 g/10 min, or about 0.1 g/10 min to about 0.5 g/10 min.

The terms "melt index ratio," "MIR," and "$I_{21}/I_2$," are used interchangeably and refer to the ratio of the flow index (FI) or ($I_{21}$) to MI ($I_2$). The FI ($I_{21}$) is measured in accordance with ASTM D-1238-F (at 190° C., 21.6 kg weight). The first polyethylene can have a MIR ($I_{21}/I_2$) of less than 30. The first polyethylene can have a MIR ranging from a low of about 20, about 22, or about 24 to a high of about 25, about 26, about 27, about 28, about 29, or about 30. For example, the first polyethylene can have a MIR ranging from about 20 to about 30, or about 22 to about 28, or about 24 to about 28.

The second polyethylene can have a MIR of greater than 30. The second polyethylene can have a MIR of greater than about 30.1, 30.5, 31, 32, 33, 34, or 35. The second polyethylene can have a MIR ranging from a low of about 30.5, about 33, or about 35 to a high of about 100, about 150, or about 200. The second polyethylene can have a MIR ranging from a low of about 31, about 32, about 34, or about 36 to a high of about 50, about 70, about 80, about 90, or about 95. In at least one specific example, the second polyethylene can have a MIR of from greater than 30 to about 50 or from about 33 to about 47 or from about 35 to about 45.

The first polyethylene can have a molecular weight distribution (Mw/Mn) ranging from about 3.5 to about 5.5 and a MIR of less than 30 and the second polyethylene can have a molecular weight distribution (Mw/Mn) ranging from about 3 to about 4.5 and a MIR of greater than 30. The first polyethylene can have a Mw/Mn ranging from about 4 to about 5.5 and a MIR of less than 30 and the second polyethylene can have a Mw/Mn ranging from about 3 to about 4 and a MIR of greater than 30. The first polyethylene can have a Mw/Mn greater than 4 and up to about 5.5 and a MIR of less than 30 and the second polyethylene can have a Mw/Mn of less than 4 and a MIR of greater than 30. The first polyethylene can have a Mw/Mn ranging from about 4.1 to about 5.5 and a MIR of from about 20 to about 29 and the second polyethylene can have a Mw/Mn ranging from about 3 to about 4 and a MIR of from about 31 to about 100.

The first polyethylene can have a hexane extractables content of from about 0.3% to about 5.5%. The second polyethylene can have a hexane extractables content of less than about 5%, less than about 4%, less than about 3%, less than about 2.5%, less than about 2%, less than about 1.8%, less than about 1.5%, less than about 1.3%, or less than about 1%. For example, the second polyethylene can have a hexane extractables content of less than about 0.9%, less than about 0.7%, less than about 0.5%, or less than about 0.3%. The amount of hexane extractables in the first polyethylene, the second polyethylene, and the polymer blend can be determined according to the FDA method (see 21 C.F.R. §177.1520, as revised Apr. 1, 2005, for details on the FDA method and requirements for food contact, repeated and while cooking). As such, a polymer blend comprising the first polyethylene and the second polyethylene can have a hexane extractables content of less than about 3%, less than about 2.5%, less than about 2%, less than about 1.8%, less than about 1.5%, less than about 1.3%, or less than about 1%.

Although the polymer blend components, i.e. the first polyethylene and the second polyethylene, have been discussed as single polyethylenes, blends of two or more such first polyethylenes and/or second polyethylenes having the properties discussed and described herein can be used. In other words, the first polyethylene can include two or more first polyethylenes that differ from one another, but both have the properties discussed and described above with reference to the first polyethylene that differentiate the first polyethylene from the second polyethylene. Similarly, the second polyethylene can include two or more second polyethylenes that differ from one another, but both have the properties discussed and described above that differentiate the second polyethylene from the first polyethylene.

Illustrative other polyethylenes that can be blended with the first polyethylene and/or the second polyethylene, depending on the particular properties thereof, can include, but are not limited to, very low density polyethylenes (VLDPE), LDPEs, LLDPEs, and medium density polyethylenes (MDPE). Very low density polyethylene (VLDPE) is a subset of LLDPE. VLDPEs can be produced by a number of different processes yielding polymers with different properties, but can generally be described as polyethylenes having a density typically from 0.890 or 0.900 g/cm$^3$ to less than 0.915 g/cm$^3$. Relatively higher density linear polyethylene, typically in the range of 0.930 g/cm$^3$ to 0.945 g/cm$^3$, while often considered to be within the scope of LDPE, can also be referred to as "medium density polyethylene" (MDPE).

Preparation of Blends

The polymer blend can be formed using conventional equipment and methods, such as by dry blending the individual components and subsequently melt mixing in a mixer or by mixing the components together directly in a mixer, such as, for example, a Banbury mixer, a Haake mixer, a Brabender internal mixer, or a single or twin-screw extruder, which can include a compounding extruder and a side-arm extruder used directly downstream of a polymerization process. A mixture or blend of the first and second polyethylenes can be indicated by the uniformity of the morphology of the composition. In another example, the polymer blend can be produced in situ using a multistage polymerization reactor arrangement and process. In a multistage reactor arrangement two or more reactors can be connected in series where a mixture of a first polymer and catalyst precursor can be transferred from a first reactor to a second reactor where a second polymer can be produced and blended in situ with the first polymer. A multi-stage polymerization reactor and methods for using the same can be similar to as discussed and described in U.S. Pat. No. 5,677,375, for example.

The polymer blend can include at least 0.1 percent by weight (wt %) and up to 99.9 wt % of the first polyethylene and at least 0.1 wt % and up to 99.9 wt % of the second polyethylene, based on the total weight of the first polyethylene and the second polyethylene. The amount of the second polyethylene in the polymer blend can range from a low of about 5 wt %, about 10 wt %, about 20 wt %, about 30 wt %, or about 40 wt % to a high of about 60 wt %, about 70 wt %, about 80 wt %, about 90 wt %, or about 95 wt %, based on the total weight of the first polyethylene and the second polyethylene. For example, the amount of the second polyethylene in the polymer blend can range from about 15 wt % to about 40 wt %, about 10 wt % to about 35 wt %, or about 20 wt % to about 45 wt %, based on the total weight of the first polyethylene and the second polyethylene. In another example, the amount of the second polyethylene in the polymer blend can be at least 5 wt %, at least 10 wt %, at least 15 wt %, at least 20 wt %, at least 25 wt %, at least 30 wt %, or at least 35 wt % and less than about 50 wt %, based on the total weight of the first and second polyethylenes. The polymer blend can include from about 20 wt % to about 35 wt % of the second polyethylene and from about 65 wt % to about 80 wt % of the first polyethylene, based on the total weight of the first and second polyethylenes.

End Uses

The polymer blend that includes the first polyethylene and the second polyethylene can be used for any number of applications. The polymer blend can be used alone or in combination with one or more other polymers, blends of polymers, and the like, to produce an end use product. Exemplary end uses can include, but are not limited to, films, film-based products, diaper backsheets, housewrap, wire and cable coating compositions, articles formed by molding techniques, e.g., injection or blow molding, extrusion coating, foaming, casting, and combinations thereof. End uses can also include products made from films, e.g., bags, packaging, and personal care films, pouches, medical products, such as for example, medical films and intravenous (IV) bags. For end uses that include films, either or both of the surfaces of the films produced from the polyethylene blend can be modified by known and conventional post-forming techniques such as corona discharge, chemical treatment, flame treatment, and the like.

Specific end use films can include, for example, stretch films. Illustrative stretch films or stretch-type films can include, but are not limited to, stretch cling films, stretch handwrap films, and machine stretch films. Other types of films can include, but are not limited to, shrink films, shrink wrap films, green house films, laminates, and laminate films. The films can be prepared by any conventional technique known to those skilled in the art, such as for example, techniques utilized to prepare blown, extruded, and/or cast stretch and/or shrink films (including shrink-on-shrink applications). The term "stretch film" refers to films capable of stretching and applying a bundling force and includes films stretched at the time of application as well as "pre-stretched" films, i.e., films which are provided in a pre-stretched form for use without additional stretching. The films can be monolayer films or multilayer films.

Additives

A variety of additives may be employed in the adhesive blend formulations described herein depending upon the performance characteristics required by a particular application. The additives can be included in the polymer blend, in one or more components of the polymer blend, e.g. the first polyethylene and/or the second polyethylene, and/or in a product formed from the polymer blend, such as a film, as desired. The polymer blends discussed and described herein can include from about 0.1 wt % to about 40 wt % additives or from about 5 wt % to about 25 wt % additives, based on the total weight of the overall polymer blend.

Examples of such additives include, but are not limited to, tackifiers, waxes, functionalized polymers such as acid modified polyolefins and/or anhydride modified polyolefins, antioxidants (e.g., hindered phenolics such as IRGANOX® 1010 or IRGANOX® 1076 available from Ciba-Geigy), (e.g., IRGAFOS® 168 available from Ciba-Geigy), oils, compatabilizers, fillers, adjuvants, adhesion promoters, plasticizers, low molecular weight polymers, blocking agents, antiblocking agents, anti-static agents, release agents, anti-cling additives, colorants, dyes, pigments, processing aids, UV stabilizers, heat stabilizers, neutralizers, lubricants, surfactants, nucleating agents, flexibilizers, rubbers, optical brighteners, colorants, diluents, viscosity modifiers, oxidized polyolefins, and any combination thereof. Additives can be combined with one or both of the first or second polyethylene and/or may be combined with the blend of the first and second polyethylene as further individual components, in masterbatches, or in any combination thereof.

For stretch film applications, an additive such as a tackifier can be used in one or more layers to provide a cling force. Illustrative tackifiers include any known tackifier effective in providing and/or improving cling force such as, for example, polybutenes, low molecular weight polyisobutylenes (PIB), polyterpenes, amorphous polypropylene, ethylene vinyl acetate copolymers, microcrystalline wax, alkali metal sulfosuccinates, and mono- and di-glycerides of fatty acids, such as glycerol monostearate, glycerol monooleate, sorbitan monolaurate, sorbitan monopalmitate, sorbitan monostearate, sorbitan monooleate, hydrocarbon resins, and any combination thereof. The tackifier, if used, can be used in any concentration which will impact the desired cling force, typically from 0.1 to 20% by weight, or from 0.25 to 6.0% by weight. Tackifier(s) can be used in monolayer films or in multiple layer films. In multiple layer films, one or more tackifiers can be added to both outer layers to provide a stretch film having two-sided cling, or in only one outer layer, to provide a stretch film having one-sided cling.

In one example, monolayer films can be prepared from the polymer blend. In another example, multilayer films can be prepared from the polymer blend or blends thereof. Multilayer films can include one or more layers of film made from polymers other than the polymer blend that comprises the first polyethylene and the second polyethylene. Monolayer films and/or at least one layer of a multilayer film can include the polymer blend, i.e. the polymer blend comprising the first polyethylene and the second polyethylene.

Films can be formed by any number of well known extrusion or coextrusion techniques. Any of the blown, tentered, or cast film techniques commonly used are suitable. Films can be unoriented, uniaxially oriented, or biaxially oriented. The films can further be embossed, produced, and/or processed according to other known film processes. The films can be tailored to specific applications by adjusting the thickness, materials, and order of the various layers, as well as the additives applied or introduced to each layer.

The polymer blend comprising the first polyethylene and the second polyethylene can be formed into monolayer and/or multilayer films using casting techniques, such as a chill roll casting process. For example, a polymer blend composition can be extruded in a molten state through a flat die and then cooled to form a film. As a specific example, cast films can be prepared using a cast film line machine as follows. Pellets of the polymer are melted at a temperature typically ranging from about 275° C. to about 325° C. for cast polymers (depending upon the particular polymer(s) used), with the specific melt temperature being chosen to match the melt viscosity of the particular polymer(s). In the case of a multilayer cast film, the two or more different melts can be conveyed to a coextrusion adapter that combines the two or more melt flows into a multilayer, coextruded structure. This layered flow can be distributed through a single manifold film extrusion die to the desired width. The die gap opening is typically about 600 μm (0.025 inches). The material can then be drawn down to the final gauge. The material draw down ratio is typically about 21:1 for 20 μm (0.8 mil) films. A vacuum box, edge pinners, air knife, or any combination thereof, can be used to pin the melt exiting the die opening to a primary chill roll maintained at about 32° C. (80° F.). The resulting film can be collected on a winder. The film thickness can be monitored by a gauge monitor, and the film can be edge trimmed by a trimmer A typical cast line rate is from about 76.2 m to about 610 m (250 ft to about 2,000 feet) per minute. One skilled in the art will appreciate that higher rates may be used for similar processes such as extrusion coating. One or more optional treaters can be used to surface treat the film, if desired. Such chill roll casting processes and apparatus can be as discussed and described in, for example, The Wiley-Encyclopedia of Packaging Technology, Second Edition, A. L. Brody and K. S. Marsh, Ed., John Wiley and Sons, Inc., New York (1997). Although chill roll casting is one example, other forms of casting may be employed.

The polymer blend comprising the first polyethylene and the second polyethylene can be formed into monolayer and/or multilayer films using blown techniques, i.e., to form a blown film. For example, the polymer blend can be extruded in a molten state through an annular die and then blown and cooled to form a tubular, blown film, which can then be axially slit and unfolded to form a flat film. As a specific example, blown films can be prepared as follows. The polymer blend can be introduced into the feed hopper of an extruder, such as a 63.5 mm Egan extruder that is water-cooled, resistance heated, and has an L/D ratio of 24:1. The film can be produced using a 15.24 cm Sano die with a 2.24 mm die gap, along with a Sano dual orifice non-rotating, non-adjustable air ring. The film can be extruded through the die into a film cooled by blowing air onto the surface of the film. The film can be drawn from the die typically forming a cylindrical film that can be cooled, collapsed and, optionally, subjected to a desired auxiliary process, such as slitting, treating, sealing, or printing. Typical melt temperatures can range from about 175° C. to about 225° C. Blown film rates can generally range from about 4.35 kg/hr/cm to about 26 kg/hr/cm (5 lbs/hr/in to about 30 lbs/hr/in) of die circumference. The finished film can be wound into rolls for later processing or can be fed into a bag machine and converted into bags. A particular blown film process and apparatus suitable for forming films can be as discussed and described in, for example, U.S. Pat. No. 5,569,693. Of course, other blown film forming methods can also be used.

Films formed from the polymer blend comprising the first polyethylene and the second polyethylene can be uniaxially or biaxially oriented. Orientation in the direction of extrusion is known as machine direction (MD) orientation. Orientation perpendicular to the direction of extrusion is known as transverse direction (TD) orientation. Orientation can be accomplished by stretching or pulling a film first in the MD followed by TD orientation. Blown films or cast films can also be oriented by a tenter-frame orientation subsequent to the film extrusion process, again in one or both directions. Orientation can be sequential or simultaneous, depending upon the desired film features. Preferred orientation ratios can be about three to about six times the extruded width in the machine direction and between about four to about ten times the extruded width in the transverse direction. Typical commercial orientation processes are BOPP tenter process, blown film, and LISIM technology.

The total thickness of the resulting monolayer and/or multilayer films can vary based, at least in part, on the particular end use application. A total film thickness of about 5 µm to about 100 µm, more typically about 10 µm to about 50 µm, can be suitable for most applications. Those skilled in the art will appreciate that the thickness of individual layers for multilayer films can be adjusted based on desired end use performance, polymer or copolymer employed, equipment capability and other factors.

To facilitate discussion of different multilayer film structures, the following notation is used herein. Each layer of a film is denoted "A" or "B", where "A" indicates a film layer not containing the polymer blend comprising the first polyethylene and the second polyethylene, and "B" indicates a film layer having the polymer blend comprising the first polyethylene and the second polyethylene. The "B" layer can include the polymer blend comprising the first and second polyethylenes or another blend comprising the polymer blend and one or more other polymers. Where a film includes more than one A layer or more than one B layer, one or more prime symbols (', ", "', etc.) are appended to the A or B symbol to indicate layers of the same type that can be the same or can differ in one or more properties, such as chemical composition, density, melt index, thickness, etc. Finally, the symbols for adjacent layers are separated by a slash (/). Using this notation, a three-layer film having an inner or core layer of the polymer blend comprising the first and second polyethylenes disposed between two outer, conventional film layers, i.e. not containing the polymer blend comprising the first and second polyethylenes, would be denoted A/B/A'. Similarly, a five-layer film of alternating conventional/polymer blend layers would be denoted A/B/A'/B'/A". Unless otherwise indicated, the left-to-right or right-to-left order of layers does not matter, nor does the order of prime symbols. For example, an A/B film is equivalent to a B/A film, and an A/A'/B/A" film is equivalent to an A/B/A'/A", film, for purposes described herein.

The relative thickness of each film layer is similarly denoted, with the thickness of each layer relative to a total film thickness of 100 (dimensionless) indicated numerically and separated by slashes; e.g., the relative thickness of an A/B/A' film having A and A' layers of 10 µm each and a B layer of 30 µm is denoted as 20/60/20. Exemplary conventional films can be as discussed and described in, for example, U.S. Pat. Nos. 6,423,420; 6,255,426; 6,265,055; 6,093,480; 6,083,611; 5,922,441; 5,907,943; 5,907,942; 5,902,684; 5,814,399; 5,752,362; 5,749,202; 7,235,607; 7,601,409; RE 38,658; RE 38,429; U.S. Patent Publication No. 2007/0260016; and WO Publication No. WO2005/065945.

For the various films described herein, the "A" layer can be formed of any material known in the art for use in multilayer films or in film-coated products. Thus, for example, the A layer can be formed of a polyethylene (homopolymer or copolymer), and the polyethylene can be, for example, a VLDPE, LDPE, LLDPE, MDPE, HDPE, as well as other polyethylenes known in the art. In another example, the A layer can be formed of a polyethylene (homopolymer or copolymer), a non-polyethylene polymer, e.g. a polypropylene, or a blend of a polyethylene and a non-polyethylene polymer.

Illustrative additional polymers (non-polyethylenes) that can be used as or in the A layer can include, but are not limited to, other polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Suitable polyolefins can include, but are not limited to, polymers comprising one or more linear, branched or cyclic $C_2$ to $C_{40}$ olefins, preferably polymers comprising propylene copolymerized with one or more $C_3$ to $C_{40}$ olefins, preferably a $C_3$ to $C_{20}$ alpha olefin, more preferably $C_3$ to $C_{10}$ alpha-olefins.

In multilayer structures, one or more A layers can also be an adhesion-promoting tie layer, such as PRIMACOR™ ethylene-acrylic acid copolymers available from Dow Chemical Co. and/or ethylene-vinyl acetate copolymers. Other materials for A layers can be, for example, foil, nylon, ethylene-vinyl alcohol copolymers, polyvinylidene chloride, polyethylene terephthalate, oriented polypropylene, ethylene-vinyl acetate copolymers, ethylene-acrylic acid copolymers, ethylene-methacrylic acid copolymers, graft modified polymers, and paper.

One or more A layers can be replaced with a substrate layer, such as glass, plastic, paper, metal, etc., or the entire film can be coated or laminated onto a substrate. Thus, although the discussion herein has focused on multilayer films, the films having a blend comprising the first polyethylene and the second polyethylene can also be used as coatings; e.g., films (monolayer and multilayer) can be coated onto a substrate such as paper, metal, glass, plastic and other materials capable of accepting a coating.

The "B" layer can be formed of the polymer blend comprising the first polymer and the second polymer, and can be any of such blends described herein. In one example, the B layer can be formed of the polymer blend comprising from about 0.1 wt % to about 99.9 wt % of the first polyethylene and from about 99.9 wt % to about 0.1 wt % of the second polyethylene. The "A" layer can be formed of a polymer or a blend of one or more polymers that can include very low density polyethylene, medium density polyethylene, differentiated polyethylene, or any combination thereof In a multilayer film the "A" layer can be formed of the first polyethylene and the "B" layer can be formed of the polymer blend comprising the first polyethylene and the second polyethylene.

The polymer film can be a multilayer film with any of the following exemplary structures: (a) two-layer films, such as A/B and B/B'; (b) three-layer films, such as A/B/A', A/A'/B, B/A/B' and B/B'/B"; (c) four-layer films, such as A/A'/A"/B, A/A'/B/A", A/A'/B/B', A/B/B'/A', B/A/A'/B', A/B'/B", B/A/B'/B" and B/B'/B"/B'"; (d) five-layer films, such as A/A'/A"/A'''/B, A/A'/A"/B/A''', A/A'/B/A"/A''', A/A'/A"/B/B', A/A'/B/A"/B', A/A'/B/B'/A", A/B/A'/B'/A", A/B/A'/A"/B, B/A/A'/A"/B', A/A'/B/B'/B", A/B/A'/B'/B", A/B/B'/B"/A', B/A/A'/B'/B", B/A/B'/A'/B", B/A/B'/B"/A', A/B/B'/B"/B''', B/A/B'/B"/B''', B/B'/A/B"/B''', and B/B'/B"/B'''/B""; and similar structures for films having six, seven, eight, nine, twenty-four, forty-eight, sixty-four, one hundred, or any other number of layers. It should be appreciated that films having still more layers can be formed using polymer blends, and such films are within the scope of the invention.

Any of the polymers discussed and described herein, e.g. the first polyethylene, second polyethylene, VLDPEs, LDPEs, LLDPEs, MDPEs, HDPEs, and the like, can be prepared via any known process or combination of processes including, but not limited to, solution, slurry, high pressure, and/or gas phase processes. Suitable gas phase polymerization processes for producing the first polyethylene and/or the second polyethylene are described in U.S. Pat. Nos. 3,709,853; 4,003,712; 4,011,382; 4,302,566; 4,543,399; 4,588,790; 4,882,400; 5,028,670; 5,352,749; 5,405,922; 5,541,270; 5,627,242; 5,665,818; 5,677,375; 6,255,426; European Patent Nos. EP0802202; EP0794200; EP0649992 EP0634421; and Belgian Patent No. 839,380. Examples of solution or slurry polymerization processes are described in U.S. Pat. Nos. 4,271,060; 4,613,484; 5,001,205; 5,236,998; and 5,589,555.

Any catalyst or combination of catalysts suitable for producing polyethylenes and other polymers can be used in any one or more polymerization processes to produce the first polyethylene, the second polyethylene, the polymer blend, and/or other polymers that can be used in conjunction with the polymer blend. Illustrative catalysts can include, but are not limited to, Ziegler-Natta catalysts, chromium-based catalysts, metallocene catalysts and other single-site catalysts including Group 15-containing catalysts, bimetallic catalysts, and mixed catalysts. The catalyst or catalyst system can also include $AlCl_3$, cobalt, iron, palladium, chromium/chromium oxide or "Phillips" catalysts. Any catalyst can be used alone or in combination with any other catalyst.

Metallocenes are generally described throughout in, for example, 1 & 2 Metallocene-Based Polyolefins (John Scheirs & W. Kaminsky, eds., John Wiley & Sons, Ltd. 2000); G. G. Hlatky in 181 Coordination Chem. Rev. 243-296 (1999) and in particular, for use in the synthesis of polyethylene in 1 Metallocene-Based Polyolefins 261-377 (2000). Other suitable metallocene catalyst compounds can include, but are not limited to, metallocenes described in U.S. Pat. Nos. 7,179,876; 7,169,864; 7,157,531; 7,129,302; 6,995,109; 6,958,306; 6,884,748; 6,689,847; 5,026,798; 5,703,187; 5,747,406; 6,069,213; 7,244,795; 7,579,415; U.S. Patent Application Publication No. 2007/0055028; and WO Publications WO 97/22635; WO 00/699/22; WO 01/30860; WO 01/30861; WO 02/46246; WO 02/50088; WO 04/022230; WO 04/026921; and WO 06/019494.

The "Group 15-containing catalyst" may include Group 3 to Group 12 metal complexes, wherein the metal is 2 to 8 coordinate, the coordinating moiety or moieties including at least two Group 15 atoms, and up to four Group 15 atoms. For example, the Group 15-containing catalyst component can be a complex of a Group 4 metal and from one to four ligands such that the Group 4 metal is at least 2 coordinate, the coordinating moiety or moieties including at least two nitrogens. Representative Group 15-containing compounds are disclosed in WO Publication No. WO 99/01460; European Publication Nos. EP0893454A1; EP 0894005A1; U.S. Pat. Nos. 5,318,935; 5,889,128; 6,333,389; and 6,271,325.

Illustrative Ziegler-Natta catalyst compounds are disclosed in Ziegler Catalysts 363-386 (G. Fink, R. Mulhaupt and H. H. Brintzinger, eds., Springer-Verlag 1995); European Patent Nos. EP 0103120; EP 1102503; EP 0231102; EP 0703246; U.S. Pat. No. RE 33,683; U.S. Pat. Nos. 4,115,639; 4,077,904; 4,302,565; 4,302,566; 4,482,687; 4,564,605; 4,721,763; 4,879,359; 4,960,741; 5,518,973; 5,525,678; 5,288,933; 5,290,745; 5,093,415; and 6,562,905; and U.S. Patent Application Publication No. 2008/0194780. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Suitable chromium catalysts can include di-substituted chromates, such as $CrO_2(OR)_2$; where R is triphenylsilane or a tertiary polyalicyclic alkyl. The chromium catalyst system may further include $CrO_3$, chromocene, silyl chromate, chromyl chloride ($CrO_2Cl_2$), chromium-2-ethyl-hexanoate, chromium acetylacetonate ($Cr(AcAc)_3$), and the like. Other non-limiting examples of chromium catalysts can be as discussed and described in U.S. Pat. No. 6,989,344.

The mixed catalyst can be a bimetallic catalyst composition or a multi-catalyst composition. As used herein, the terms "bimetallic catalyst composition" and "bimetallic catalyst" include any composition, mixture, or system that includes two or more different catalyst components, each having a different metal group. The terms "multi-catalyst composition" and "multi-catalyst" include any composition, mixture, or system that includes two or more different catalyst components regardless of the metals. Therefore, the terms "bimetallic catalyst composition," "bimetallic catalyst," "multi-catalyst composition," and "multi-catalyst" will be collectively referred to herein as a "mixed catalyst" unless specifically noted otherwise. In one example, the mixed catalyst includes at least one metallocene catalyst component and at least one non-metallocene component.

In some embodiments, an activator may be used with the catalyst compound. As used herein, the term "activator" refers to any compound or combination of compounds, supported or unsupported, which can activate a catalyst compound or component, such as by creating a cationic species of the catalyst component. Illustrative activators include, but are not limited to, aluminoxane (e.g., methylaluminoxane "MAO"), modified aluminoxane (e.g., modified methylaluminoxane "MMAO" and/or tetraisobutyldialuminoxane "TIBAO"), and alkylaluminum compounds, ionizing activators (neutral or ionic) such as tri(n-butyl)ammonium tetrakis (pentafluorophenyl)boron may be also be used, and combinations thereof.

The catalyst compositions can include a support material or carrier. As used herein, the terms "support" and "carrier" are used interchangeably and are any support material, including a porous support material, for example, talc, inorganic oxides, and inorganic chlorides. The catalyst component(s) and/or activator(s) can be deposited on, contacted with, vaporized with, bonded to, or incorporated within, adsorbed or absorbed in, or on, one or more supports or carriers. Other support materials can include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof. Suitable catalyst supports can as discussed and described in, for example, Hlatky, Chem. Rev. (2000), 100, 1347 1376 and Fink et al., Chem. Rev. (2000), 100, 1377 1390, U.S. Pat. Nos. 4,701,432; 4,808,561; 4,912,075; 4,925,821; 4,937,217; 5,008,228; 5,238,892; 5,240,894; 5,332,706; 5,346,925; 5,422,325; 5,466,649; 5,466,766; 5,468,702; 5,529,965; 5,554,704; 5,629,253; 5,639,835; 5,625,015; 5,643,847; 5,665,665; 5,698,487; 5,714,424; 5,723,400; 5,723,402; 5,731,261; 5,759,940; 5,767,032; 5,770,664; and 5,972,510; and PCT Publication Nos. WO 95/32995; WO 95/14044; WO 96/06187; WO 97/02297; WO 99/47598; WO 99/48605; and WO 99/50311.

Film Properties

Monolayer and multilayer stretch films that include the polymer blend comprising the first polyethylene and the second polyethylene can be free of tiger striping when stretched. For example, stretch films that include the polymer blend comprising the first polyethylene and the second polyethylene can be free of tiger striping from 0% stretch to greater than 50% stretch, greater than 100% stretch, greater than 150% stretch, greater than 200% stretch, greater than 225% stretch, greater than 250% stretch, or greater than 275% stretch. In other words, a stretch film that includes the polymer blend can be stretched from an initial or "as produced" state until the film breaks without exhibiting tiger striping.

Stretch films can be monolayer or multilayer, with one or more layers comprising the polymer blend. The stretch films can be co-extruded and can include a layer comprising the polymer blend discussed and described herein, along with one or more layers of traditional Ziegler-Natta or metallocene catalyzed LLDPE, which can optionally include a comonomer such as 1-hexene, 1-butene, and/or 1-octene, for example.

Stretch films can have a Highlight ultimate stretch greater than or equal to about 220%, about 230%, about 240%, about 250%, about 260%, about 270%, about 280%, about 290%, or about 300%. Stretch cling films can have a Highlight ultimate stretch force greater than or equal to about 267 N (60 pounds), about 311 N (70 pounds), about 334 N (75 pounds), about 356 N (80 pounds), about 378 N (85 pounds), or about 400 N (90 pounds).

Highlight ultimate stretch, reported as a percentage, and Highlight ultimate stretch force, reported in Newtons (N) and pounds force (pounds), were measured by a Highlight Stretch tester using the Highlight recommended machine settings and normal industry practices. Occurrence of tiger striping was visually observed and recorded during the ultimate stretch test. Results are reported as an average of three tests unless otherwise noted. The nominal thickness before stretching for all films discussed herein was 20.3 μm (0.80 mil).

Stretch cling films can have an initial or first cling value (parallel) at 0% of about 140 grams-force per inch width, about 150 grams-force per inch width, about 160 grams-force per inch width, about 170 grams-force per inch width, about 180 grams-force per inch width, about 190 grams-force per inch width, about 200 grams-force per inch width, about 210 grams-force per inch width, about 220 grams-force per inch width, about 230 grams-force per inch width, about 240 grams-force per inch width, or about 250 grams-force per inch width. Cling for stretch cling films can be measured according to the standard ASTM D 5458 test modified according to the following procedure. For the ASTM D 5448 test, the test speed is set at 5 in/min and only the top testing strip is stretched to the desired percent stretch. The modified test used for the values provided herein uses a test speed of 3.94 in/min and both the top testing strip and the bottom (platform) testing strip are stretched to the desired percent stretch.

Stretch cling films that include the polymer blend comprising the first polyethylene and the second polyethylene can be described as having an initial or first cling value at 0% stretch and a second cling value at 200% stretch. The second cling value at 200% stretch can be greater than about 45% of the first cling value. In another example, the second cling value at 200% stretch can range from about 40% to about 60% of the first cling value, about 40% to about 55% of the first cling value, about 44% to about 53% of the first cling value, or about 42% to about 58% of the first cling value. In another example, the second cling value at 200% stretch can be greater than about 44%, about 45%, 46%, about 47%, about 48%, about 49%, about 50%, about 51%, or about 52% of the first cling value. For example, a stretch cling film having a first cling value at 0% stretch of 150 grams-force per inch width can have a second cling value at 200% stretch greater than about 67.5 grams-force per inch width.

The polymer blend discussed and described herein can also be suitable for use in stretch handwrap films. Stretch handwrap films require a combination of excellent film toughness, especially puncture, MD tear performance, dart drop performance, and a stiff, i.e. difficult to stretch, film. Film stiffness minimizes the stretch required to provide adequate load holding force to a wrapped load and to prevent further stretching of the film. The film toughness can be required because handwrap film loads (being wrapped) are typically more irregular and frequently contain greater puncture requirements than typical machine stretch loads. Stretch handwrap films can exhibit a Highlight ultimate stretch force greater than or equal to about 267 N (60 pounds), about 311 N (70 pounds), about 334 N (75 pounds), about 356 N (80 pounds), about 378 N (85 pounds), about 400 N (90 pounds), about 445 N (100 pounds), or about 556 N (125 pounds).

EXAMPLES

To provide a better understanding of the foregoing discussion, the following non-limiting examples are provided. Although the examples are directed to specific embodiments, they are not to be viewed as limiting the invention in any specific respect. All parts, proportions and percentages are by weight unless otherwise indicated.

A first polyethylene ($1^{st}$ PE) was used to prepare a comparative example multilayer film (CEx1). Two additional multilayer films (Ex. 1 and Ex. 2) were also prepared and included at least one layer formed from a polymer blend comprising the first polyethylene and a second polyethylene ($2^{nd}$ PE). Table 1 lists some physical properties for the first polyethylene ($1^{st}$ PE) and the second polyethylene ($2^{nd}$ PE).

TABLE 1

|  | 1st PE | 2nd PE |
|---|---|---|
| Comonomer | 1-Hexene | 1-Hexene |
| Catalyst | Ziegler-Natta | Metallocene |
| Presence of LCB | No | Yes |
| Density (g/cm$^3$) | 0.919 | 0.920 |
| Melt Index ($I_2$) | 2.47 | 0.54 |
| FI ($I_{21}$) | 67.9 | 20.1 |
| MIR ($I_{21}/I_2$) | 27.5 | 37.2 |
| Mn | 23,312 | 30,689 |
| Mw | 96,041 | 107,599 |
| Mz | 260,035 | 217,790 |

TABLE 1-continued

|  | 1st PE | 2nd PE |
|---|---|---|
| Mw/Mn | 4.12 | 3.51 |
| Mz/Mw | 2.71 | 2.02 |
| SCB (per 1,000 C.) | 19.9 | 12.7 |

Cast films were extruded on a 3.5" Black Clawson line (30:1 L:D) equipped with a 42" slot die. Line speed was set at 750 ft/min and total output was adjusted (typically 575-590 lb/h) to achieve film having a nominal thickness of 0.8 mil. A standard "hump" temperature profile was used where "BZ" is barrel zone: BZ1=176.7° C. (350° F.), BZ2=232.2° C. (450° F.), BZ3=273.9° C. (525° F.), BZ4=282.2° C. (540° F.), BZ5=276.7° C. (530° F.), BZ6=276.7° C. (530° F.), and Die=287.8° C. (550° F.). The film edge was trimmed to give a 20" roll for testing. The three multilayer films, namely CEx. 1, Ex. 1, and Ex. 2, had the structures A/A'/A, A/B/A, and B'/B/B', respectively. Each film has a thickness ratio of 10/80/10 and an overall thickness of 20.3 μm (0.80 mils). Properties for the three films (CEx. 1, Ex. 1, and Ex. 2) are shown in Table 2.

The CEx. 1 film was formed of only the first polyethylene ($1^{st}$ PE) and had an onset of tiger striping at 70% stretch that ended at about 183% stretch. Surprisingly and unexpectedly, tiger stripping was not observed in Ex. 1 and Ex. 2 in which the polymer blend containing the first polyethylene ($1^{st}$ PE) and the second polyethylene ($2^{nd}$ PE) was used in at least one layer. The film of Ex. 1 used the polymer blend in only the inner or core layer while the film of Ex. 2 used the polymer blend in all three layers.

Additionally, both Ex. 1 and Ex. 2 surprisingly and unexpectedly exhibited increased cling after stretching to 200%, as compared to CEx. 1. More particularly, comparative example CEx. 1 had an initial cling (parallel) at zero (0%) stretch of 145 grams-force per inch width and only 63 grams-force per inch width at 200% stretch, a loss of 82 grams-force per inch width. Ex. 1, however, had an initial cling (parallel) at zero (0%) stretch of 144 grams-force per inch width and 75 grams-force per inch width at 200% stretch, a loss of only 69 grams-force per inch width. Example 2 had a cling (parallel) at zero (0%) stretch of 194 grams-force per inch width, which was 49 grams-force per inch width greater than CEx. 1. Additionally, Ex. 2 had a cling (parallel) at 200% stretch of 92

TABLE 2

|  | CEx. 1 | | Ex. 1 | | Ex. 2 | |
|---|---|---|---|---|---|---|
| Film Structure and Composition | A-10% | 1st PE | A-10% | 1st PE | B'-10% | 75% 1st PE |
|  |  |  |  |  |  | 25% 2nd PE |
|  | A'-80% | 1st PE | B-80% | 75% 1st PE | B-80% | 75% 1st PE |
|  |  |  |  | 25% 2nd PE |  | 25% 2nd PE |
|  | A-10% | 1st PE | A-10% | 1st PE | B'-10% | 75% 1st PE |
|  |  |  |  |  |  | 25% 2nd PE |
| Tackifier | 2% PIB in one A layer | | 2% PIB in one A layer | | 2% PIB in one B' layer | |
| Film Thickness (μm) | 20.8 | | 21.3 | | 20.6 | |
| Hexane Extractables (%) | 2.18 | | 1.80 | | 1.71 | |
| Ultimate Stretch Force (lb) | 70 | | 83 | | 94 | |
| Ultimate Stretch (%) | 270 | | 249 | | 221 | |
| Onset Tiger Striping (%) | 70 | | None | | None | |
| End Tiger Striping (%) | 183 | | None | | None | |
| Unwind Force (lb) | 8.84 | | 7.81 | | 6.57 | |
| Cling-Parallel @ 0% (grams-force per inch width) | 145 | | 144 | | 194 | |
| Cling-Parallel @ 100% (grams-force per inch width) | 103 | | 98 | | 137 | |
| Cling-Parallel @ 200% (grams-force per inch width) | 63 | | 75 | | 92 | |
| Cling-Parallel @ 250% (grams-force per inch width) | 56 | | 69 | | 78 | |
| Cling Loss (from 0% to 200%) (grams-force per inch width) | −82 | | −69 | | −102 | |
| Cling Loss (from 0 to 250%) (grams-force per inch width) | −89 | | −75 | | −116 | |
| 1% Secant Modulus, MD (MPa) | 120 | | 109 | | 106 | |
| 1% Secant Modulus, TD (MPa) | 130 | | 127 | | 128 | |
| Tensile at Yield, MD (MPa) | 7.3 | | 7.2 | | 7.0 | |
| Tensile at Yield, TD (MPa) | 7.1 | | 6.7 | | 6.5 | |
| Elongation at yield, MD (%) | 6.3 | | 6.8 | | 7 | |
| Elongation at yield, TD (%) | 5.6 | | 5.5 | | 5.7 | |
| Tensile at Break, MD (MPa) | 57.6 | | 64.9 | | 64.5 | |
| Tensile at Break, TD (MPa) | 37.1 | | 38.0 | | 38.3 | |
| Elongation at Break, MD (%) | 445 | | 419 | | 369 | |
| Elongation at Break, TD (%) | 843 | | 846 | | 835 | |
| Elmendorf Tear, MD (g/μm) | 8.7 | | 11.6 | | 11.2 | |
| Elmendorf Tear, TD (g/μm) | 26.2 | | 36.2 | | 33.0 | |
| Dart Impact (g/μm) | 3.3 | | 3.5 | | 4.3 | |
| Haze (%) | 1.6 | | 1.4 | | 1.6 | |
| Highlight Puncture Force @ 100% (lb) | 3.11 | | 2.69 | | 2.52 | |
| Highlight Puncture Force @ 150% (lb) | 3.22 | | 2.39 | | 2.16 | |
| Highlight Puncture Force @ 200% (lb) | 0.98 | | 1.38 | | 1.17 | | grams-force per inch width, which is about 29 grams-force per inch width greater than CEx. 1. Both Ex. 1 and Ex. 2 had cling values at 200% stretch that were greater than 45% of the film's initial cling values at zero (0%) stretch, while CEx. 1 had a cling value at 200% stretch that was less than 45% of the film's initial cling value at zero (0%) stretch.

Comparative Example CEx. 2, and examples Ex. 3, Ex. 4, Ex. 5, and Ex. 6 were also prepared as three-layer films having the A/A'/A structure, with all three layers having the same composition as one another. The films all had a ratio of thickness of 10/80/10 and an overall thickness of 20.3 μm (0.80 mils). For CEx. 2 the polyethylene used was a Ziegler Natta LLDPE ethylene/hexene copolymer. For Ex. 3 the polyethylene used was a Ziegler Natta LLDPE ethylene/hexene copolymer. For Ex. 4, the polyethylene used was a Ziegler Natta LLDPE ethylene/octene copolymer. For Ex. 5 the polyethylene used was a metallocene LLDPE ethylene/hexene copolymer. For Ex. 6 the polyethylene used was a 70/30 polymer blend of the polyethylene used in Ex. 5 and another polyethylene metallocene LLDPE ethylene/hexene copolymer. Table 3 shows some properties for the polyethylenes used in CEx. 2, and Ex. 3-6.

TABLE 3

|  | CEx. 2 | Ex. 3 | Ex. 4 | Ex. 5 | Ex. 6 |
| --- | --- | --- | --- | --- | --- |
| Comonomer | 1-Hexene | 1-Hexene | 1-Octene | 1-Hexene | 1-Hexene |
| Catalyst | Ziegler-Natta | Ziegler-Natta | Ziegler-Natta | Metallocene | Metallocene |
| Presence of LCB | No | No | No | No | No |
| Density (g/cm$^3$) | 0.9186 | 0.9191 | 0.9170 | 0.9195 | 0.9279 |
| Melt Index ($I_2$) | 3.31 | 2.23 | 2.35 | 3.42 | 3.60 |
| FI ($I_{21}$) | 93 | 62.9 | 61.2 | 57.1 | 58.5 |
| MIR ($I_{21}/I_2$) | 28.0 | 28.2 | 26.0 | 16.7 | 16.3 |
| Mn | 20,888 | 23,532 | 26,184 | 33,378 | 29,631 |
| Mw | 87,306 | 97,855 | 93,820 | 81,565 | 80,988 |
| Mz | 239,794 | 265,269 | 239,322 | 142,003 | 144,576 |
| Mw/Mn | 4.18 | 4.16 | 3.58 | 2.44 | 2.73 |
| Mz/Mw | 2.75 | 2.71 | 2.55 | 1.74 | 1.79 |
| SCB (per 1,000 C.) | 21.0 | 20.0 | 15.2 | 14.4 | 9.3 |

Properties for the five films (CEx. 2 and Ex. 3-6) are shown in Table 4. The films were prepared on a Black Clawson line, similar to CEx. 1, Ex. 1, and Ex. 2, discussed above.

TABLE 4

|  | CEx. 2 | Ex. 3 | Ex. 4 | Ex. 5 | Ex. 6 |
| --- | --- | --- | --- | --- | --- |
| Tackifier | 2% PIB in one A layer | 2% PIB in one A layer | 2% PIB in one A layer | 2% PIB in one A layer | 2% PIB in one A layer |
| Film Thickness (μm) | 20.8 | 21.3 | 20.6 | 21.1 | 21.1 |
| Hexane Extractables (%) | 3.37 | 2.78 | 1.07 | 0.50 | 0.48 |
| Ultimate Stretch Force (lb) | 67 | 75 | 74 | 68 | 69 |
| Ultimate Stretch (%) | 284 | 249 | 249 | 255 | 310 |
| Onset Tiger Striping (%) | 64 | None | None | 62 | 81 |
| End Tiger Striping (%) | 209 | None | None | 222 | 260 |
| Unwind Force (lb) | 9.5 | 9.0 | 5.2 | 4.7 | 4.4 |
| Cling - Parallel @ 0% (grams-force per inch width) | 163 | 153 | 91 | 112 | 106 |
| Cling - Parallel @ 100% (grams-force per inch width) | 108 | 108 | 82 | 91 | 75 |
| Cling - Parallel @ 200% (grams-force per inch width) | 81 | 81 | 74 | 66 | 54 |
| Cling - Parallel @ 250% (grams-force per inch width) | 69 | 60 | 60 | 63 | 61 |
| Cling Loss (from 0% to 200%) (grams-force per inch width) | −82 | −72 | −17 | −46 | −52 |
| Cling Loss (from 0% to 250%) (grams-force per inch width) | −94 | −48 | −31 | −49 | −45 |
| 1% Secant Modulus, MD (MPa) | 109.6 | 116.4 | 99.5 | 102.2 | 124.3 |
| 1% Secant Modulus, TD (MPa) | 120.7 | 133.0 | 109.3 | 111.7 | 130.8 |
| Tensile at Yield, MD (MPa) | 6.8 | 7.4 | 6.4 | 6.2 | 7.0 |
| Tensile at Yield, TD (MPa) | 6.3 | 7.0 | 5.9 | 5.7 | 6.8 |
| Elongation at yield, MD (%) | 6.4 | 6.3 | 7.5 | 7.7 | 6.6 |
| Elongation at yield, TD (%) | 5.7 | 5.5 | 6.1 | 7.0 | 6.1 |
| Tensile at Break, MD (MPa) | 55.1 | 66.0 | 59.2 | 59.0 | 52.5 |
| Tensile at Break, TD (MPa) | 34.0 | 39.4 | 38.8 | 43.9 | 43.9 |
| Elongation at Break, MD (%) | 500 | 467 | 409 | 476 | 519 |
| Elongation at Break, TD (%) | 859 | 906 | 785 | 677 | 703 |
| Elmendorf Tear, MD (g/μm) | 8.9 | 14.4 | 14.6 | 6.8 | 8.5 |
| Elmendorf Tear, TD (g/μm) | 29.7 | 30.4 | 24.8 | 16.8 | 17.7 |
| Dart Impact Strength (g/μm) | 3.0 | 2.7 | 6.2 | 6.7 | 5.2 |
| Haze (%) | 1.9 | 1.9 | 0.7 | 2.0 | 2.1 |

Ex. 3 is a polyethylene made using the same catalyst and under similar conditions as the polyethylene of CEx. 2. The polymerization conditions were modified such that the melt index ($I_2$) for Ex. 3 was reduced from 3.31 g/10 min to 2.23 g/10 min. Reducing the melt index ($I_2$) surprisingly and unexpectedly eliminated tiger striping in Ex. 3. Without wishing to be bound by theory, it is believed that reducing the melt index ($I_2$) of comparative example CEx2 eliminates tiger stripping because of the promotion of strain hardening which minimizes the tendency of localized deformation. Accordingly, modifying the polymerization conditions of a particular polyethylene such that the melt index is reduced can produce a polyethylene suitable for use in stretch films or stretch cling films that does not exhibit any tiger striping during stretch.

Ex. 4 was prepared from a polyethylene produced using a different Ziegler-Natta catalyst than the polyethylenes in CEx. 1, CEx. 2, and Ex. 3. The melt index ($I_2$) for Ex. 4 was 2.35 g/10 min. Some desirable properties for polyethylenes used to make stretch films that do not exhibit tiger striping can be derived from the data provided from CEx. 1, CEx. 2, and Ex. 3 and Ex. 4. For a single LLDPE, i.e. not a blend of two or more polyethylenes, a desirable property appears to be that a melt index of less than about 2.45 may tend to produce films that do not exhibit tiger striping when stretched. The polyethylenes in CEx. 1 and CEx. 2 have a melt index greater than 2.45 and the polyethylenes in Ex. 3 and Ex. 4 have a melt index less than 2.45. As such, rather than preparing films from a polymer blend comprising the first polyethylene and the second polyethylene as discussed and described herein, one can modify polymerization conditions for a single polyethylene, i.e. not a blend of two or more polyethylenes, such that the melt index is reduced. As shown in Ex. 3 and Ex. 4, films prepared from polyethylene having a reduced melt index can be free from tiger striping when stretched.

Also it is worth noting that Ex. 5 and Ex. 6, contrary to the prior art, exhibited a higher initial cling than Ex. 4 while having a lower amount of hexane extractables. The expected trend in cling is that cling will decrease as the amount of hexane extractables is decreased. In direct contrast to the prior art, however, the initial cling for Ex. 5 and Ex. 6 were higher than Ex. 4, which had significantly higher hexane extractables content (112 and 106 grams-force per inch width, respectively, as compared to 91 grams-force per inch width). Without wishing to be bound by theory, it is believed that Ex. 5 and Ex. 6 had a much smoother film surface than Ex. 4 as suggested by AFM (Atomic Force Microscopy) pictures. The smooth film surface of Ex. 5 and Ex. 6 was due to a unique morphology from this particular product family.

Short Chain Branching (SCB) can be determined by $^1$HNMR (proton nuclear magnetic resonance) with data collected at 500 MHz. Spectra can be referenced by setting the polymer backbone signal to 1.347 ppm. Methyl group contents in ethylene 1-olefin copolymers can be calculated from the $^1$H NMR spectrum using the following formula: Methyl Groups/1000 Carbons=$(I_{CH3}*0.33*1000)(I_{0.5-2.1\ ppm}*0.5)$, where $I_{CH3}$ is the normalized methyl signal area in the region between 0.88 and 1.05 ppm and $I_{0.5-2.1\ ppm}$ is the area between 0.50 and 2.10 ppm. The number of methyl groups correspond to the number of short chain branches in the polyethylene assuming that the short chain branches contain 1 methyl (—$CH_3$) group and that all methyl groups are a result of short chain branching.

1% Secant Modulus (both MD and TD) was determined in accordance with ASTM D882-97. The film gauge was measured according to ASTM D5947-96 Method C, except that the micrometer calibration was performed annually with a commercially available gauge block (Starret Webber 9, JCV1&2).

Tensile strength values (tensile yield, tensile at break, elongation at yield, and elongation at break) were measured (machine direction ("MD") and transverse direction ("TD")) in accordance with ASTM D882-97. The film gauge was measured using ASTM D5947-96 Method C, except that the micrometer calibration was performed annually with a commercially available gauge block (Starret Webber 9, JCV1&2).

Elmendorf tear was determined in accordance with ASTM D1922-94a. The film gauge was measured according to ASTM D374-94 Method C, except that the micrometer calibration was performed annually with a commercially available gauge block (Starret Webber 9, JCV1&2).

Dart Drop Impact Strength, reported in grams per micrometer (g/µm), was measured as specified by ASTM D-1709, method A.

Haze (%) was determined according to ASTM D1003-97 using the alternate Haze Shortcut Procedure.

Highlight Puncture Force, reported in pounds (lb), was measured by a Highlight Stretch tester using a method consistent with Highlight recommended machine settings. Results are reported as an average of two tests unless otherwise noted.

Gauge: film thickness was measured according to ASTM D374-94 Method C, except that the micrometer calibration was performed annually with a commercially available gauge block (Starret Webber 9, JCV1&2).

Density was measured in accordance with ASTM D-792.

MI ($I_2$) was measured in accordance with ASTM D-1238-E (at 190° C., 2.16 kg weight).

FI ($I_{21}$) was measured in accordance with ASTM D-1238-F (at 190° C., 21.6 kg weight).

Mw, Mn, and Mz was measured using gel permeation chromatography (GPC), also known as size exclusion chromatography (SEC), as described above.

All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A polymer blend, comprising:
a first polyethylene having a density of less than about 0.940 g/cm$^3$, a melt index ($I_2$) greater than 0.75 g/10 min, a melt index ratio ($I_{21}/I_2$) of less than 30, and a molecular weight distribution (Mw/Mn) of from about 3.5 to about 5.5; and
a second polyethylene having a density of less than about 0.940 g/cm, a melt index ($I_2$) of less than 1 g/10 min, a melt index ratio ($I_{21}/I_2$) greater than 30, and a molecular weight distribution (Mw/Mn) of less than 4.5, $M_w$ and Mn being determined using gel permeation chromatography, density being determined in accordance with ASTM D-792, $I_2$ being determined using ASTM D-1238E (at 190° C., using a 2.16 kg weight) and $I_{21}$ being determined using ASTM D-1238F (at 190° C., using a 21.6 kg weight).

2. The polymer blend of claim 1, wherein the melt index ($I_2$) of the second polyethylene ranges from about 0.01 g/10 min to about 0.8 g/10 min.

3. The polymer blend of claim 1, wherein the melt index ($I_2$) of the second polyethylene ranges from about 0.01 g/10 min to about 0.6 g/10 min.

4. The polymer blend of claim 1, wherein the melt index ($I_2$) of the first polyethylene is greater than 1 g/10 min and less than 20 g/10 min.

5. The polymer blend of claim 1, wherein the melt index ratio ($I_{21}/I_2$) of the second polyethylene ranges from about 33 to about 150 and the molecular weight distribution (Mw/Mn) of the second polyethylene ranges from about 3 to about 4.2.

6. The polymer blend of claim 1, wherein the melt index ratio ($I_{21}/I_2$) of the second polyethylene ranges from about 35 to about 100 and the molecular weight distribution (Mw/Mn) of the second polyethylene ranges from about 3 to about 4.

7. The polymer blend of claim 1, wherein the second polyethylene is present in an amount of from about 5 wt % to about 40 wt % based on the total combined weight of the first polyethylene and the second polyethylene.

8. The polymer blend of claim 1, wherein the first polyethylene comprises a copolymer derived from ethylene and one or more $C_3$ to $C_{20}$ α-olefin comonomers, and wherein the second polyethylene comprises a copolymer derived from ethylene and one or more $C_3$ to $C_{20}$ α-olefin comonomers.

9. The polymer blend of claim 1, wherein the density of the first polyethylene ranges from about 0.915 g/cm³ to about 0.925 g/cm³, and wherein the density of the second polyethylene ranges from about 0.915 g/cm³ to about 0.925 g/cm³.

10. The polymer blend of claim 1, wherein the first polyethylene has a molecular weight distribution (Mw/Mn) of from about 4.1 to about 5.5, and wherein the second polyethylene has a molecular weight distribution (Mw/Mn) of from about 3 to about 4.

11. A film comprising the polymer blend according to claim 1.

12. The film of claim 11, wherein the first polyethylene has a density in the range of from 0.915 g/cm³ to about 0.940 g/cm³, a melt index ($I_2$) in the range of from 0.75 g/10 min to about 20 g/10 min, and a melt index ratio ($I_{21}/I_2$) in the range of from 20 to about 30.

13. The film of claim 11, wherein the second polyethylene has a density in the range of from 0.915 g/cm³ to about 0.940 g/cm³, a melt index ($I_2$) in the range of from 0.01 g/10 min to about 0.9 g/10 min, and a melt index ratio ($I_{21}/I_2$) in the range of from 30 to about 150, and a molecular weight distribution (Mw/Mn) in the range of from about 3 to about 4.5.

14. The film of claim 11, wherein the film is multilayer, and wherein at least one layer of the multilayer film comprises the polymer blend.

15. The film of claim 11, wherein the film is multilayer, and wherein at least two layers of the multilayer film comprises the polymer blend.

16. The film of claim 11, wherein the film is a stretch cling film.

17. The film of claim 16, wherein the stretch cling film has a first cling value at 0% stretch of about 5.51 grams—force per mm width (140 grams-force per inch width) or more and a second cling value of about 2.76 grams-force per mm width (70 grams-force per inch width) or more after stretching to 200%.

18. The film of claim 16, wherein the stretch cling film has first cling value at 0% stretch, and wherein the stretch cling film as a second cling value after stretching to 200% that is greater than 45% of the first cling value.

19. The film of claim 16, wherein the stretch cling film stretches to at least 200% without exhibiting tiger striping.

* * * * *